United States Patent

[11] 3,572,561

| [72] | Inventor | Herbert J. McCauley |
| | | 86 Dana Road, Buffalo, N.Y. 14216 |
| [21] | Appl. No. | 825,816 |
| [22] | Filed | May 19, 1969 |
| [45] | Patented | Mar. 30, 1971 |

[54] LUGGAGE CARRIER ACCESSORY
4 Claims, 4 Drawing Figs.

| [52] | U.S. Cl. | 224/32 |
| [51] | Int. Cl. | B62j 7/04 |
| [50] | Field of Search | 224/32.1, 39 |

[56] References Cited
UNITED STATES PATENTS
2,531,902  11/1950  Baron..................... 224/32(.1)
2,537,441  1/1951  Burri..................... 224/32(.1)

Primary Examiner—Robert G. Sheridan
Attorney—Christel & Bean

ABSTRACT: A luggage carrier accessory for attachment to a bicycle comprising a load support platform or frame having a series of crossmembers extending between and connected to the side portions of the frame. A mounting plate secures the load support frame to spaced vertical seat or saddle support struts mounted on the bicycle frame. Carrier rods are connected at one end of each to the side portions of the load support frame and at their other ends to the saddle support struts. The load support frame is vertically adjustable on the saddle support struts relative to the bicycle frame.

Patented March 30, 1971
3,572,561
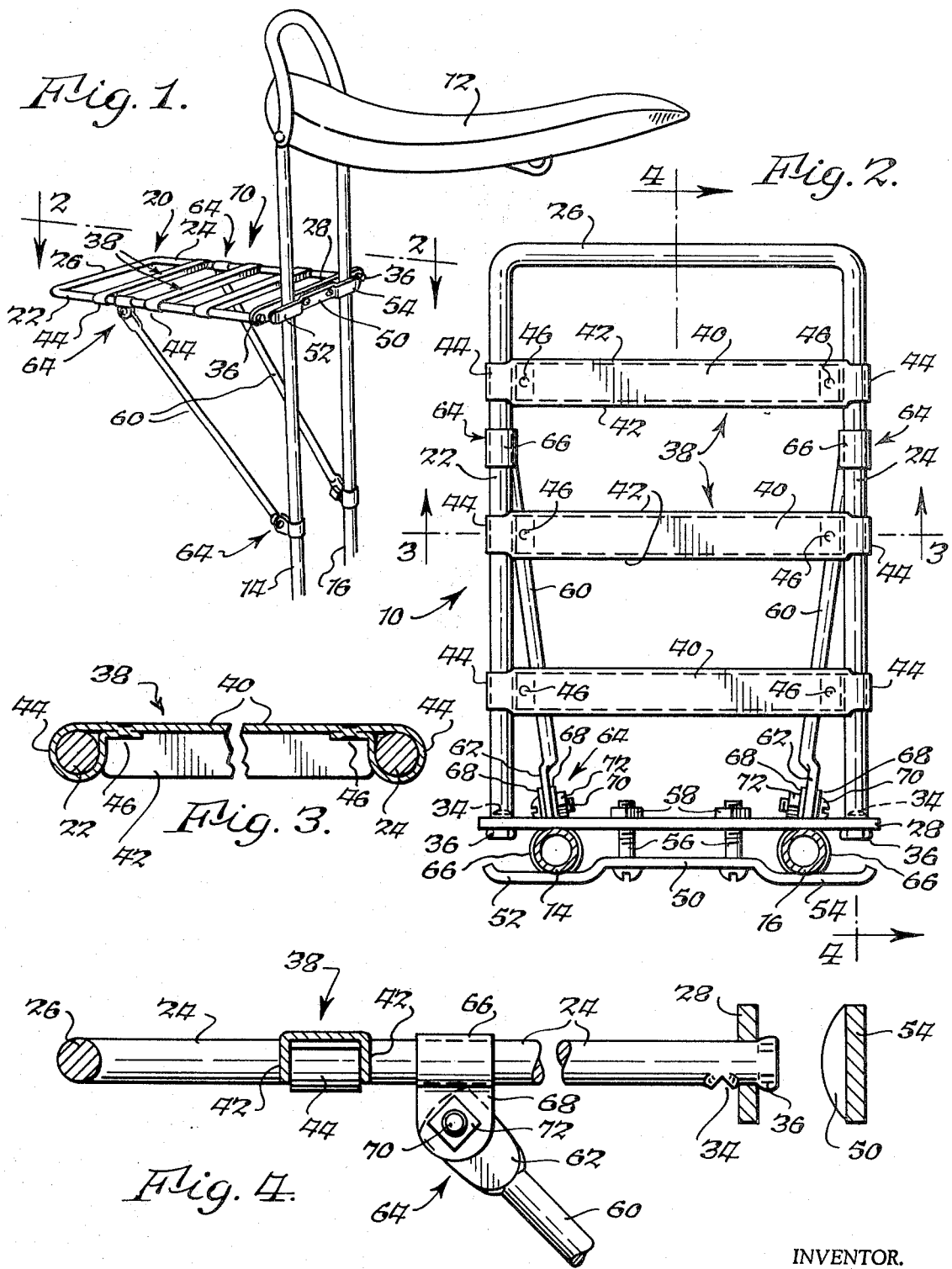
INVENTOR.
Herbert J. McCauley
BY
Christel & Bean
ATTORNEYS.

LUGGAGE CARRIER ACCESSORY

BACKGROUND OF THE INVENTION

This invention relates to a load support accessory and, more particularly, to a support accessory of the luggage carrier type used on bicycles.

It is known to provide luggage carriers on bicycles, which luggage carriers are generally mounted above the rear fender rearwardly of the seat. Generally, these luggage carriers are made as accessories for certain sizes of bicycles and are not adapted to fill all available sizes and types. Moreover, they are not suited for attachment to high rise "banana saddle" type bicycles wherein the "banana saddle" type seat is located substantially above the level of the bicycle frame.

SUMMARY OF THE INVENTION

The luggage carrier accessory of the present invention, as hereinafter described, provides an adjustable luggage carrier, which is simple and strong in construction, rugged and durable in use, and which is adapted to be used on all sizes of bicycles of the high rise "banana saddle" variety.

Generally speaking, the luggage carrier of the present invention comprises a load support platform or frame having a series of channel-shaped crossmembers extending between and fixedly secured to opposite side rails of the frame. A mounting plate connects the frame to a pair of laterally spaced upright saddle support struts by means of bolts engaging through the mounting plate and the load support frame. A pair of brace rods are fastened to the side legs of the load support frame rearwardly of the saddle support struts and to a lower portion of the saddle support struts to serve as reinforcement and force reaction members for the load support frame. The luggage carrier can be adjusted to various selected vertical positions relative to the bicycle frame.

BRIEF DESCRIPTION OF THE DRAWINGS

FIG. 1 is a fragmentary perspective view of one form of a luggage carrier accessory of the present invention shown attached to a pair of seat support struts;

FIG. 2 is a top plan view taken as indicated by line 2-2 of FIG. 1;

FIG. 3 is a vertical sectional view, taken on line 3-3 of FIG. 2; and

FIG. 4 is a vertical sectional view, taken on line 4-4 of FIG. 2.

DESCRIPTION OF THE PREFERRED EMBODIMENT

Referring to the drawings, there is shown a preferred embodiment of a load support or luggage carrier accessory, generally designated 10, constructed in accordance with the principles of this invention, and adapted to be mounted on a bicycle seat support means attached to the frame of a bicycle (not shown). As shown in FIG. 1 the seat 12 is of the type commonly referred to as a "banana saddle" because of its configuration and is supported substantially above the frame of the bicycle on the upper ends of a pair of upright generally parallel struts 14 and 16 secured adjacent their lower ends to the frame of the bicycle (not shown).

In accordance with this invention, the luggage carrier accessory 10 comprises a generally U-shaped horizontal frame 20 having a pair of parallel legs 22 and 24 and a bight portion 26 forming the rear end of the frame. The front ends of legs 22 and 24 extend through openings provided in an elongated end bracket 28 and extend outwardly therefrom to form projections which are swaged to form raised locking projections as shown at 34 and 36.

A series of crossmembers, generally designated 38, extend transversely between legs 22 and 24. Each crossmember 38 is in the form of a channel having a web 40 and a pair of opposite side flanges. Extending outwardly from the ends of web 40 and formed integral therewith are a pair of tongues 44 which permanently secure crossmembers 38 to legs 22 and 24. Tongues 44 are bent about legs 22 and 24 with the free end portions of tongues 44 spot welded as shown at 46 in FIG. 3 or otherwise fixedly secured to web 40 whereby crossmembers 38 form a strong, rigid connection between legs 22 and 24.

Means are provided for securely mounting frame 20 on saddle support struts 14 and 16, such means comprising an elongated mounting plate 50 having curved end portions 52 and 54, the inner surfaces of which engage saddle support struts 14 and 16. Openings are provided in mounting plate 50 and register with openings in end bracket 28 for receiving bolts 56 having nuts 58 to releasably secure frame 20 to saddle support struts 14 and 16.

In order to reinforce and support the cantilevered portion of frame 20, a pair of brace rods 60 are provided. Each rod 60 has flattened ends 62 which are attached to legs 22 and 24 and saddle support struts 14 and 16 by fastening means, generally designated 64. Each such fastening mean comprises a U-shaped clip 66 adapted to embrace either a saddle support strut or a frame side leg and has a pair of spaced, generally parallel leg portions 68 for receiving one of the flat ends 62 of a rod 60.

Leg portions 68 and the flat ends 62 of rods 60 are provided with openings in registry with each other for receiving bolts 70 having nuts 72. The fastening means are identical at each end of rods 60 and the same reference characters are used to identify similar parts, it being understood that the sizes of the clips may vary to conform to the saddle support strut and frame leg diameters. Also, other types of fastening means may be used to secure rods 60 between frame 20 and the saddle support struts, if desired, within the purview of this invention.

With the clips 66 and plate 50 loosened the luggage carrier assembly may be slid vertically on support struts 14 and 16 to the desired vertical position. Screws 58, along with the bolt and nut connections of the fastening means are then tightened to secure the luggage carrier in the desired vertical position on struts 14 and 16.

The present invention thus provides a simple and novel luggage carrier accessory which can be quickly and simply mounted on a bicycle frame and readily detached therefrom. Also, the luggage carrier can be vertically adjusted to various selected positions relative to the bicycle frame and the bicycle saddle. By the provision of channel-shaped crossmembers fixedly secured to the luggage carrier frame, a rigid, unitary construction is provided possessing the requisite strength and stability to support relatively heavy loads.

An illustrative embodiment of this invention having been herein described and illustrated in the drawing, it is to be understood that numerous modifications thereof can be made without departing from the spirit and scope of this invention.

I claim:

1. A load support attachment comprising: a load supporting frame having a pair of opposite side legs and a rear end portion connecting said side legs and integrally formed therewith; a bracket forming the front end portion of said frame and extending in a direction normal to said side legs; said bracket having openings for receiving the free ends of said legs; means for securing said end bracket on said legs adjacent said free ends; at least one crossmember extending between said opposite side legs in a direction normal thereto; said cross member being of a generally U-shaped channel configuration in cross section, the medial web portion of said crossmember extending beyond said channel configuration and terminating in opposite end portions wrapped around said side legs to secure said cross member thereon, and means for adjustably mounting said load support frame to various selected vertical positions on a support means carried by a bicycle.

2. A load support attachment according to claim 1 wherein said mounting means comprises a plate and means for fastening said bracket of said load supporting frame to said plate with said support means clamped therebetween.

3. The combination according to claim 2 wherein said mounting means includes a pair of brace rods; and means for fastening corresponding ends of said rods to said side legs and the other ends of said rods to said support means below said plate.

4. The combination according to claim 1 wherein said mounting means includes a pair of brace rods; and means for fastening corresponding ends of said rods to said side legs and the other ends of said rods to said support means below said plate.